United States Patent
Honeck et al.

(10) Patent No.: US 9,429,478 B2
(45) Date of Patent: Aug. 30, 2016

(54) THERMOCOUPLE WITH INTEGRITY MONITORING

(71) Applicant: Extron Company, Plymouth, MN (US)

(72) Inventors: Randall G. Honeck, Maple Grove, MN (US); Dustin Duane Paloranta, Brooklyn Park, MN (US)

(73) Assignee: Extron Company, Plymouth, MN (US)

( * ) Notice: Subject to any disclaimer, the term of this patent is extended or adjusted under 35 U.S.C. 154(b) by 588 days.

(21) Appl. No.: 13/763,306

(22) Filed: Feb. 8, 2013

(65) Prior Publication Data

US 2013/0250999 A1    Sep. 26, 2013

Related U.S. Application Data

(60) Provisional application No. 61/633,413, filed on Feb. 10, 2012, provisional application No. 61/686,677, filed on Apr. 10, 2012.

(51) Int. Cl.
*G01K 7/00* (2006.01)
*G01K 7/02* (2006.01)
*G01K 15/00* (2006.01)

(52) U.S. Cl.
CPC .............. *G01K 7/02* (2013.01); *G01K 7/026* (2013.01); *G01K 15/007* (2013.01)

(58) Field of Classification Search
USPC ................................. 374/179, 170
See application file for complete search history.

(56) References Cited

U.S. PATENT DOCUMENTS

| | | | | |
|---|---|---|---|---|
| 3,088,073 A * | 4/1963 | Newbold | G01K 7/021 324/76.11 |
| 3,218,859 A * | 11/1965 | McBride | G01K 7/021 374/110 |
| 3,829,849 A * | 8/1974 | Stauffer | G01K 7/026 340/595 |
| 4,114,442 A * | 9/1978 | Pratt | G01K 1/026 374/113 |
| 4,324,138 A * | 4/1982 | Davis | G01K 1/026 374/111 |
| 4,440,508 A * | 4/1984 | Haloburdo, Jr. | G01K 7/14 324/169 |
| 6,777,961 B2 | 8/2004 | Hamamoto et al. | |
| 6,983,223 B2 | 1/2006 | Schuh | |
| 7,841,771 B2 * | 11/2010 | Perotti | G01K 7/026 374/170 |
| 8,118,484 B2 * | 2/2012 | Kaszynski | G01K 7/026 374/1 |
| 8,485,724 B2 * | 7/2013 | Aberra | G01K 7/14 374/100 |
| 2010/0316086 A1 * | 12/2010 | Engelstad | G01K 1/14 374/1 |
| 2011/0013669 A1 * | 1/2011 | Raj | G01K 7/02 374/179 |
| 2012/0213250 A1 * | 8/2012 | Snyder | G01N 25/32 374/179 |
| 2012/0219035 A1 * | 8/2012 | Kwon | G05B 19/054 374/170 |
| 2013/0156070 A1 * | 6/2013 | Reich | G01K 1/026 374/179 |
| 2013/0243035 A1 * | 9/2013 | Walling | G01K 7/021 374/179 |
| 2015/0036721 A1 * | 2/2015 | Lohre | G01K 7/13 374/179 |

* cited by examiner

*Primary Examiner* — Mirellys Jagan
(74) *Attorney, Agent, or Firm* — Merchant & Gould, P.C.

(57) ABSTRACT

According to one embodiment of the present disclosure a thermocouple is provided that includes an electrical component, such as a resistor, at or in close proximity to a junction where the temperature is expected to be measured. By monitoring analog voltage measurements, the system determines, for example, whether the measured temperature actually represents a temperature reading at the junction or whether the thermocouple has been compromised due to one or more of a variety of health issues, such as, a short circuit in the thermocouple, thereby causing a false junction.

14 Claims, 9 Drawing Sheets

THERMOCOUPLE WITH INTEGRITY MONITORING

RELATED APPLICATIONS

This application claims priority to U.S. Provisional Application Ser. No. 61/633,413 filed on Feb. 10, 2012 titled, "SENSOR AND QUALITY DETECTION SYSTEM" and U.S. Provisional Application Ser. No. 61/686,677 filed on Apr. 10, 2012 titled, "SYSTEM FOR TEMPERATURE DATA ACQUISITION FROM ENHANCED THERMOCOUPLES INCORPORATING AUTOMATIC DIAGNOSTICS," both of which are incorporated by reference in their entirety herein.

TECHNICAL FIELD

Devices, monitoring systems, and methods designed to monitor the integrity of one or more analog sensing devices.

INTRODUCTION

Analog sensing devices are commonly used in various applications for sensing functionality. For example, thermocouples, a particular type of sensing device, are often utilized in various devices and systems for temperature sensing. For example, a plurality of thermocouples are can be arranged within the commodity handling, manufacturing and process industries in order to repeatedly collect temperature measurements for monitoring and controlling the underlying systems. Thermocouples can be utilized in the grain industry to ensure that various components and devices handling the grain are within allowable temperature ranges due to the explosive and/or combustible nature of dust and airborne particles associated with the grain. Thus, the dependability of these systems is based on the integrity of the thermocouples, and in particular, the strength and accuracy of the signals transmitted from the thermocouples. Often times, thermocouples short circuit, thus causing the temperature reading to be inaccurate. In particular, a thermocouple with a short circuit will read the temperature at the location of the wire short, instead of at the hot junction, where two dissimilar metals of the thermocouple contact. Thus, in some instances, a short circuit will lead to an inaccurate temperature reading several feet away from the hot junction. Such an inaccuracy is often the most difficult to detect because a seemingly accurate temperature reading is received from the thermocouple. It is thus desirable to provide a thermocouple system with integrated short detection to ensure that the thermocouple is in fact measuring temperature at the hot junction.

Thermocouple with Integrity Monitoring

Concepts and technologies are described herein for improved monitoring of the integrity of analog sensing devices.

According to one embodiment of the present disclosure a thermocouple is provided that includes an electrical component, such as a resistor, at or in close proximity to a junction where the temperature is expected to be measured. By monitoring analog voltage measurements, the system determines whether the measured temperature actually represents a temperature reading at the junction or whether the thermocouple has been compromised due to one or more of a variety of health issues, such as, a short circuit in the thermocouple, thereby causing a false junction.

It should be appreciated that the above-described subject matter may be implemented as a computer-controlled apparatus, a computer process, a computing system, as an article of manufacture such as a computer-readable storage medium, and/or a single or multiple interconnected circuit boards. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

In the following detailed description, references are made to the accompanying drawings that form a part hereof, and in which are shown, by way of illustration, specific embodiments or examples.

The present disclosure relates generally to systems and methods for real-time monitoring of the health of one or more analog sensing devices, such as, for example, thermocouples. Systems and methods herein describe improved data acquisition processes accomplished by systematically analyzing and validating the integrity of analog sensing devices via the monitoring of one or more device parameters and/or measurements. In some embodiments, parameters and/or measurements may include resistance measurements, resistance to ground measurements, reactance measurements, analysis of signals of specified frequencies imposed upon the system, capacitance measurements of the system, and the like. Information from the one or more analog sensing devices is collected, gathered, indexed, and analyzed to determine the health of the analog sensing devices.

The one or more analog sensing devices of the present disclosure are configured to include an electrical component positioned in close proximity to one or more sensing locations in the devices. For example, embodiments herein include a thermocouple having a resistor positioned adjacent to a hot junction where two dissimilar conductors of the thermocouple contact. Measurements of the voltage across the resistor may be compared with known resistance values to determine potential areas of concern in the circuit.

Figure 1:
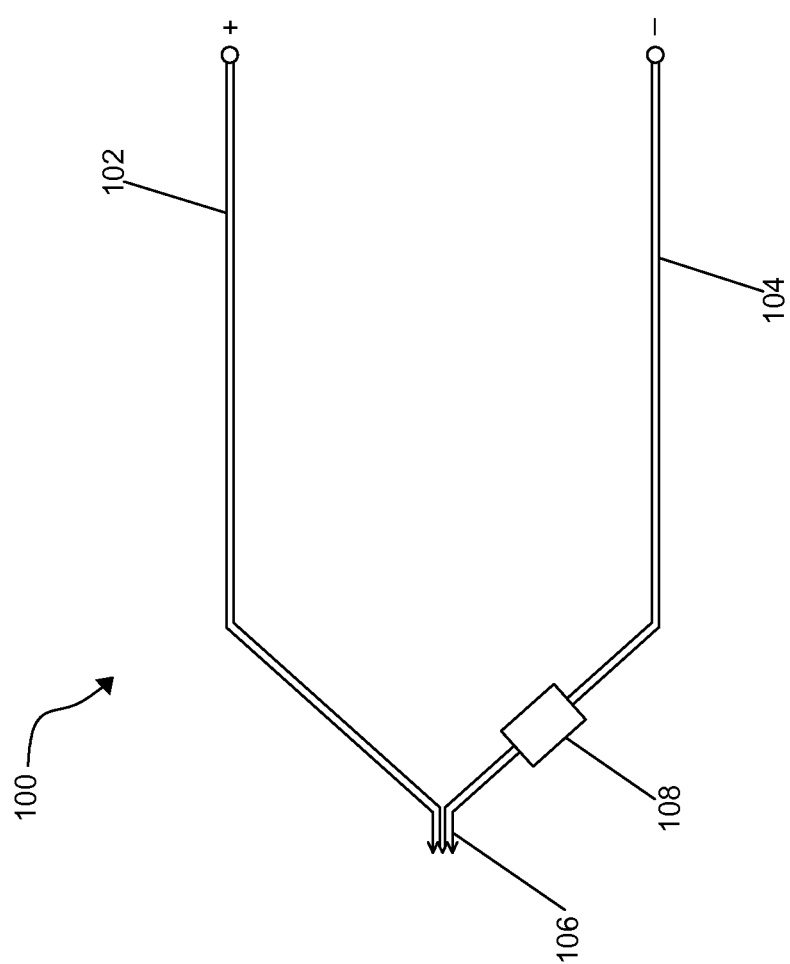
FIG. 1 is a schematic diagram of an example circuit used in accordance with an illustrative embodiment.

Now referring to FIG. 1, a schematic diagram of an example circuit depicting a thermocouple 100 according to one embodiment of the present disclosure is shown. The thermocouple 100 includes a first conductor 102, a second conductor 104, a junction 106, and an electrical component 108. In one embodiment, the thermocouple 100 may be utilized as a temperature sensor and used within several different systems.

The first conductor 102 and the second conductor 104 are dissimilar metals and contact at the junction 106. The first conductor 102 and the second conductor 104 have a polarity with respect to each other. For example, as shown in FIG. 1, the first conductor 102 is the positive leg and the second conductor 104 is the negative leg. The contact of the two dissimilar metals at the hot junction 106 creates an electron flow. A measurement of the voltage at the hot junction 106 is indicative of the temperature at the junction 106. Thus, thermocouples are used as temperature sensors in various system and devices.

The thermocouple 100 may be any type of thermocouple, such as, for example, K, E, J, N, B, R, S, T, C, and/or M type. In some embodiments, the thermocouple 100 is a T-type thermocouple in which the first conductor 102 is copper (CU) and the second conductor 104 is constantan. In general, T-type thermocouples are suited for temperature measurements within the range of –200 to 350 degrees Celsius. Such thermocouples are well suited for temperature sensing in various environments, such as, for example, the grain trade in temperature sensing in necessary to ensure that the machinery used (e.g., grain elevators, grain conveyors/belts, storage units, etc.) do not reach temperatures which could trigger the grain to explode.

The thermocouple 100 includes the electrical component 108 positioned on the second conductor 104 and adjacent to the junction 106. In some embodiments, the electrical component 108 ranges from within 0.1 inches to 0.8 inches from the junction 106. In one embodiment, the electrical component 108 is positioned less than or equal to 0.5 inches from the junction. In yet a further embodiment, the electrical component 108 is positioned at 0.6 inches from the junction. The electrical component 108 may be any electrical component, such as, for example, a resistor, reactor, capacitor, inductor, diode, transistor, integrated circuit, optoelectronic device, transducer, or the like. Measurements of or related to the electrical component 108 may be utilized to determine the health of the thermocouple 100 and the overall accuracy of the temperature measurements collected from the thermocouple 100.

In some embodiments, the electrical component 108 is a resistor. The resistor may be a one percent wire wound resistor having a resistance value of 2000 ohms. In other embodiments, the resistor may be a wire wound resistor, foil resistor, grid resistor or other known types of resistor and have a resistance value ranging between 1 ohm-5000 ohms (e.g., 1500-2500 ohms) In another embodiment, the resistance value ranges from 100 ohms-5000 ohms. In yet further embodiments, the resistor is a variable resistor which can be set based on an operator's desired functionality and/or the needs of the system.

In general, the characteristics of the resistor are chosen such that the resistance value added to the circuit is large enough to be measured, but substantially small enough to have a negligible effect on the functionality of the thermocouple 100. In some embodiments, the resistance of the resistor is at least twice as high as the resistance in the thermocouple. Real-time measurements of the voltage across the resistor may be periodically collected and compared to the known value of the added resistance. Any variations of the values may be indicative of problems with the health of the thermocouple related to, for example, high resistance, weak connections in the wires, deterioration, and the like. The values may also be indicative of whether there are inadvertent wire shorts in the thermocouple circuitry. Typically, such wire shorts are indicative that temperature measurements received may be readings of the temperature at the short, instead of at the hot junction. Thus, determining that a wire short may be present in the thermocouple allows the system to confirm that temperature readings from the thermocouple are actually representative of the location where the temperature is intended to be measured. This is important because often times inaccurate temperature readings at a short circuit may be several feet away from the junction where the temperature drastically differs from that at the junction.

Figure 2:
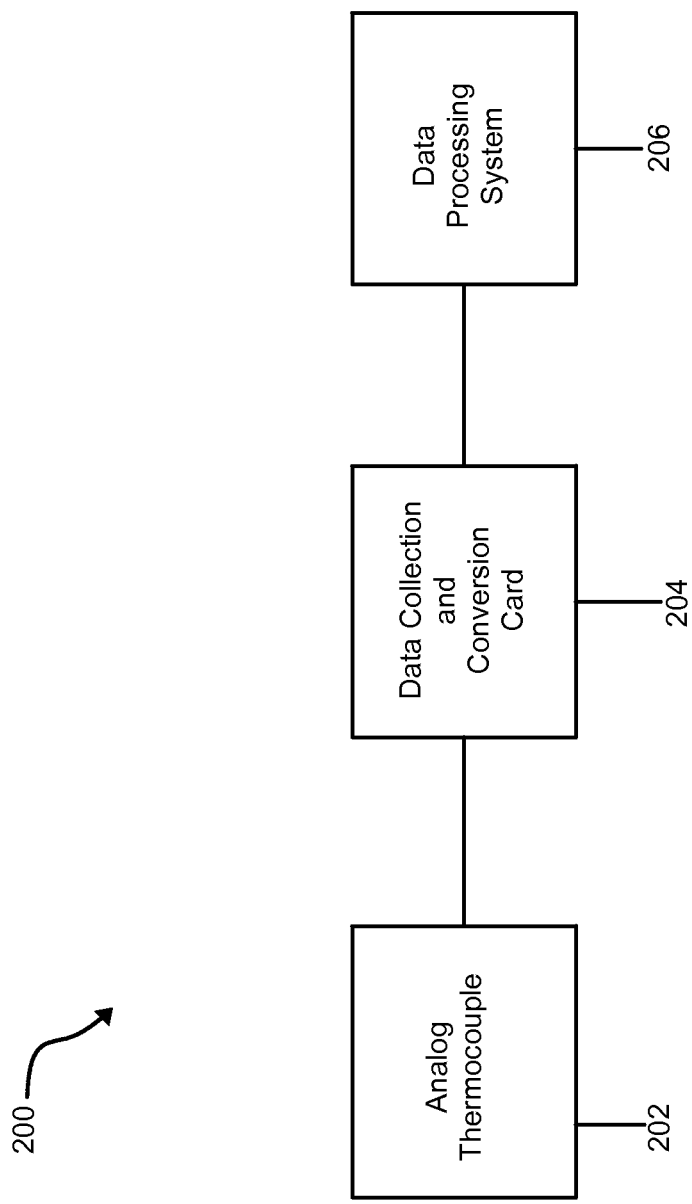
FIG. 2 is schematic diagram of an example monitoring system used in accordance with an illustrative embodiment.

Referring now to FIG. 2, a schematic diagram of an example thermocouple monitoring system 200 is shown. The monitoring system 200 includes an analog thermocouple 202, a data collection and conversion card 204, and a data processing system 206. In general, the monitoring system 200 monitors an electrical component embedded in the thermocouple, such as, for example, a resistor as described above with reference to FIG. 1, collects and converts real-time data from the thermocouple of or relating to the resistor, and then processes the data to determine whether integrity issues may exist with the thermocouple.

The thermocouple 100 shown in FIG. 1. is one example of the analog thermocouple 202. For example, the analog thermocouple 202 may be a T-type analog thermocouple having an embedded resistor less than 0.5 inches (e.g., 0.3 inches) from the junction. It is understood that in some embodiments, the analog thermocouple 202 may include two or more analog thermocouples either coupled together in the same circuit or independent of each other. It is further understood that the monitoring system 200 may monitor all or only some of the analog thermocouples in the system 200.

The data collection and conversion card 204 monitors the analog thermocouple 202 by taking one or more real-time measurements from the thermocouple 202 during predetermined time intervals. The monitoring could alternatively be continuous or sporadic rather than periodic. For example, the data collection and conversion card 204 may accept several analog voltage measurements from the thermocouple for later analysis by the data processing system 206. In some embodiments, the data collection and conversion card 204 gathers several analog voltage measurements for later analysis of integrity of the circuit, open circuit detection, short circuit detection, ground fault detection, temperature measurements, and the like. Different measurements may be collected at different periodicities based on the condition(s) being monitored.

In some embodiments, the data collection and conversion card 204 gathers voltage measurements over the embedded resistor in the thermocouple 202. These values may be filtered and then converted into a digital signal. Thereafter, the digital signals may be transmitted to the data processing system to determine if, when utilized in stored algorithms, the measurements indicate that one or more issues relating to the health of the thermocouple exist. For example, in some instances, the data processing system 206 may compare the known value of the added resistor to a computed resistance to determine whether large variations exist indicating a potential short circuit in the thermocouple 202.

The data processing system 206 accepts one or more digital signals from the data collection and conversion card 204. The data processing system 206 may access stored algorithms to analyze and process the one or more digital signals. The data processing system 206 may store the digital signals for later retrieval and analysis, immediately analyze the signals, and/or output information to an operator of the monitoring system 200 indicative of the health of the analog thermocouple 202. In some embodiments, the data processing system 206 outputs digital signals, notifications, depictions, or the like, indicative of a problem in the thermocouple, such as, for example, a high resistance, a low resistance, ground fault, open circuit, short circuit, deterioration of the circuit, or the like. For example, in some embodiments, a resistance that is sufficiently high may be indicative of an open circuit, whereas, a resistance that is sufficiently low may be indicative of a short circuit. The data processing system 206 may indicate likely causes of the issues and/or recommend solutions to the problems. In yet further embodiments, the data processing system 206 may provide an operator of the monitoring system 200 periodic updates on the health of the analog thermocouple regardless of whether the data indicates that there may be a problem with the health of the thermocouple. The updates may be transmitted to an operator via, for example, an operator computing device. The operator computing device may be connected to the digital processing system 206 via any known network (such as described below with reference to FIG. 6).

It is understood that in some embodiments, the above explained data processing occurs within the data collection and conversion card 204. Thus, in these embodiments, the data collection and conversion card 204 may include a microchip (shown in FIG. 4) which stores algorithms which are utilized to analyze and process the one or more digital signals. The data collection and conversation card 204 may store the digital signals for later retrieval and analysis, immediately analyze the signals, and/or output information to an operator of the monitoring system 200 indicative of the health of the analog thermocouple 202. In yet further embodiments, the results of such processing may be then sent to the data processing system 206 for storing and/or further processing. However, in some embodiments, no further processing is done beyond the processing within the data collection and conversion card 204 by the microchip.

Figure 3:
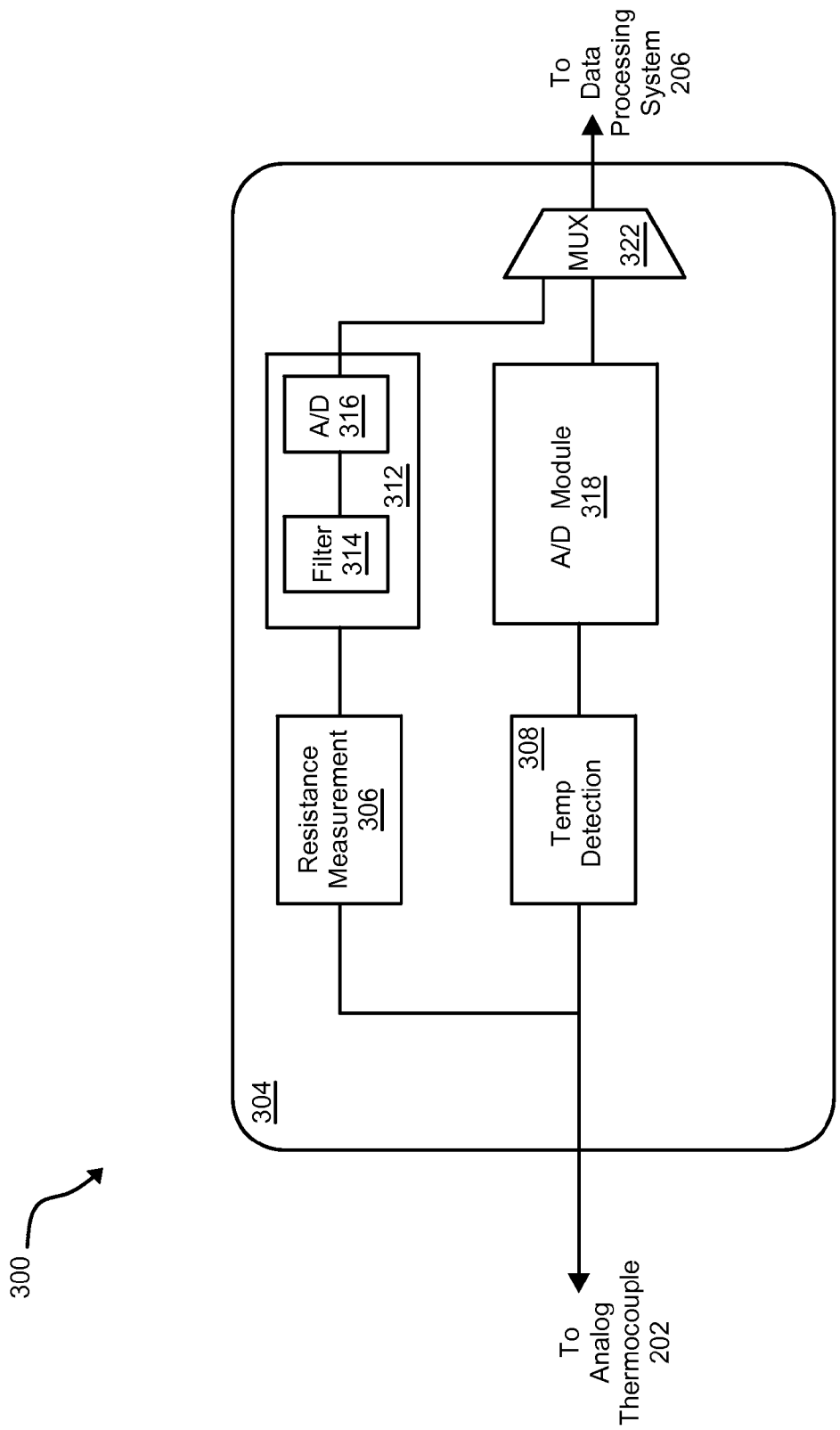
FIG. 3 is a schematic diagram of a circuit used in accordance with an illustrative embodiment.

Now referring to FIG. 3, a schematic diagram 300 of an example data collection and conversion card 304 is shown. The data collection and conversion card 304 is one example of the data collection and conversion card 204, as shown in FIG. 2. The card 304 includes resistance measurement circuit 306, a temperature detection circuit 308, analog-to-digital ("A/D") modules 312, and 318, and a card multiplexer 322. The A/D module includes a filter 314 and an A/D converter 316.

The resistance measurement circuit 306 is coupled to the thermocouple (e.g., analog thermocouple 202) and periodically collects measurements of or relating to the electrical component in the thermocouple. In some embodiments, the electrical component is a resistor with the electrical specifications discussed above. In such examples, the resistance measurement circuit 306 polls the thermocouple for analog voltage measurements across the wire having the resistor. In this way, the resistance measurement circuit 306 can determine, based on the voltage across the resistor, whether a short circuit exists in the thermocouple. In other embodiments, the resistance measurement circuit 306 further gathers alternate voltage measurements across alternate wires as reference measurements and for other integrity testing. In some embodiments, the resistance measurement circuit 306 collects measurements once every thirty seconds to once every three minutes.

The resistance measurement circuit 306 is further configured to take real-time measurements to determine if and when damage to a thermocouple occurs leaving the circuit open. In some embodiments, the resistance measurement circuit 306 consists of a small differential current source which continually flows through the thermocouple wire (e.g., out of the positive terminal and into the negative terminal). If the thermocouple circuit opens, the current produces a large voltage response. Through periodic real-time monitoring of the voltage, the resistance measurement circuit 306 can detect if the thermocouple opens and when in time the breakage occurs.

The temperature detection circuit 308 is coupled to the thermocouple 202 and collects temperature readings from the thermocouple 202. In general, the temperature detection circuit 308 reads voltage measurements from the hot junction of the thermocouple to determine the temperature at the hot junction.

In some embodiments, the card 304 operates in one or more modes. For example, in some embodiments, the card 304 operates in a normal mode in which continuous or periodic temperature measurements are taken and analyzed by the temperature detection circuit 308. At other times, the card 304 operates in a testing mode, in which real-time resistance measurements are gathered and analyzed by the resistance measurement circuit 306 to determine the integrity of the thermocouple. In some embodiments, the card 304 switches from operational modes within certain time intervals. For example, in one embodiment, the card 304 may remain in the normal mode for twenty-four (24) temperature measurements and then switch to testing mode for one resistance measurement to determine if any integrity issues exist with the thermocouple (i.e., short circuit, open circuit, etc.). In some embodiments, a cycle of twenty-four (24) temperature measurements and one resistance measurement takes approximately thirty seconds. In other embodiments, variations of the amount of measurements in each mode may exist and the amount of time to conduct a cycle may differ. For example, a cycle may take anywhere from one second to a full day. The purpose of the cycles is to ensure that the temperature measurements gathered by the temperature detection circuit 308 are reliable and are not compromised by, for example, a short circuit of the wires of the thermocouple 202. Thus, one goal of the testing mode is to ensure that temperature readings taken from the thermocouple 202 during the normal mode are actually readings of the temperature at the hot junction, as intended, instead of at a location of a wire short in the thermocouple 202.

In some embodiments, a ground fault detection circuit (not shown) may be present in the card 304. The ground fault detection circuit is coupled to the thermocouple and collects real-time measurements to determine if and when damage to a thermocouple occurs leaving the circuit disconnected from its ground connection.

In some embodiments, the resistance measurement circuit 306 does not conduct open circuit detection, but only conducts testing to determine whether there is a short in the circuit which is affecting the temperature reading. It is understood that the absence of open circuit detection circuitry does not affect the functionality of the remaining circuits or the overall card 304.

The resistance measurement circuit 306 and the temperature detection circuit 308 are each coupled to A/D modules 312, and 318, respectively. The A/D module 312 includes the filter 314 coupled to the A/D converter 316. The A/D module 318 may include both a filter and an A/D converter or only an A/D converter.

The filter 314 accepts one or more analog signal measurements from the resistance measurement circuit 306 and filter the analog signal(s) prior to conversion by the A/D converter 316. In general, the filter 314 enables the signal to be more easily read and processed by the data processing system 206. In some embodiments, the filter 314 is a low-pass filter which filters the high frequency content of the analog signal(s).

The A/D converter 316 converts the output filtered analog signal into a digital signal. In some embodiments, the A/D converter 316 is an 18-bit converter. However, in other embodiments, the A/D converter 316 can be a converter having digital outputs of anywhere between 8-32 bits. In some instances, based on the type of A/D converter utilized in the system, the filter 314 may not be necessary to filter the analog signal prior to being received at the A/D converter 316. In such embodiments, the A/D module 312, for example, may not include the filter 314.

The A/D modules 312, 318, are coupled to the digital multiplexer ("MUX") 322. The MUX 322 is further computed to the data processing system 206. The MUX 322 accepts the digital signal outputs from each of the A/D modules 312, 318 and forwards the selected inputs into a single digital stream of data which is then sent to the data processing system 206. More specifically, the MUX 322 indexes the individual signals which are indicative of different measurements and enables larger quantities of data to be transmitted to the data processing system 206. Thus, the data processing system 206 receives digital signals representing several measurements relating to the health of the thermocouple via the MUX 322.

Figure 4:
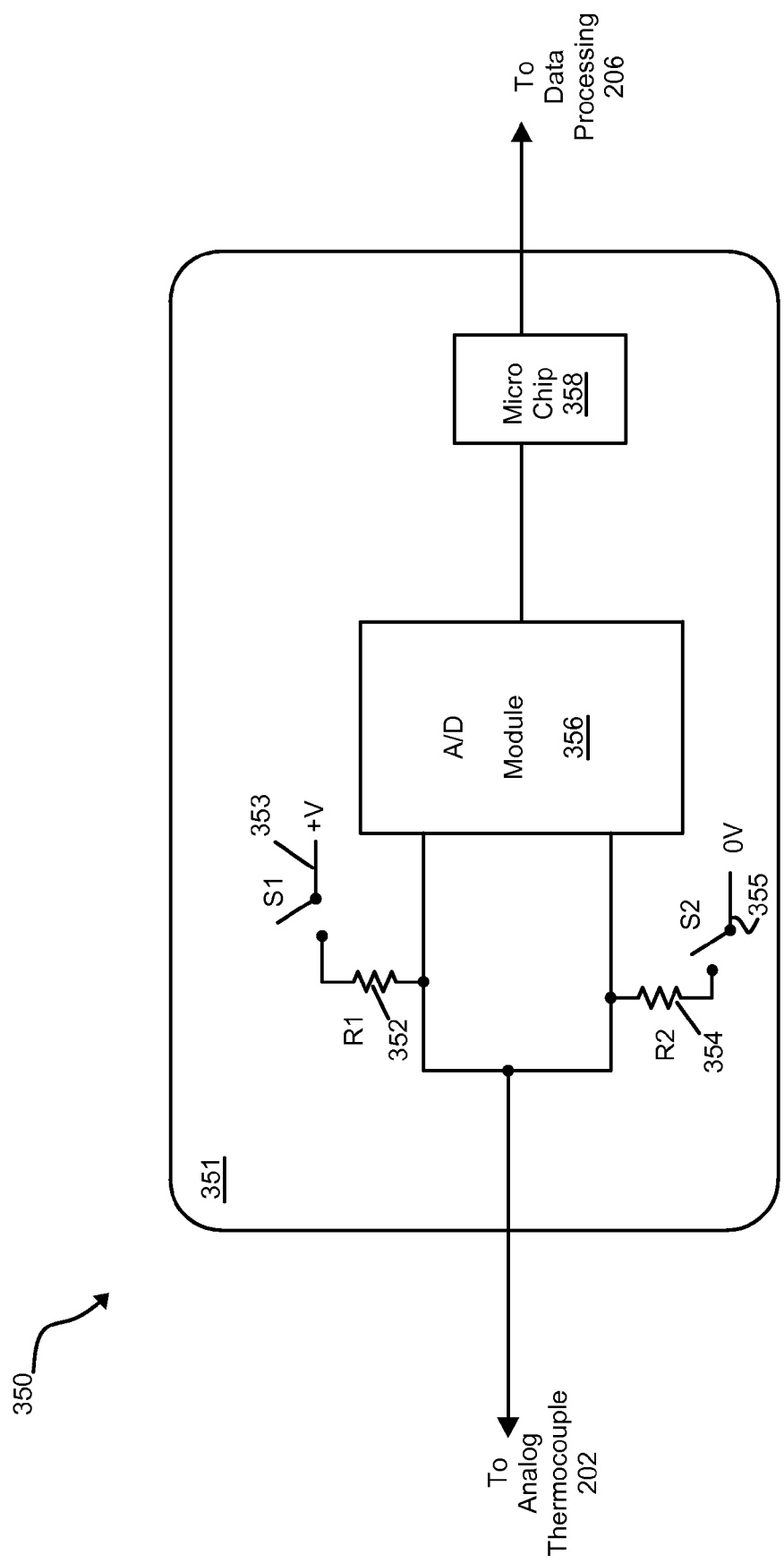
FIG. 4 is a schematic diagram of a circuit used in accordance with an illustrative embodiment.

Now referring to FIG. 4, a schematic diagram 350 of an example data collection and conversion card 351 is shown. The data collection and conversion card 350 is another example of the data collection and conversion card 204, as shown in FIG. 2. The card 351 includes a first resistor 352, a first switch 353, a second resistor 354, a second switch 355, an A/D module 356, and a microchip 358. In general, the card 351 takes several measurements, such as, resistance and temperature measurements, analyzes and processes the measurements, and determines the health of the thermocouple 202 based on the internal processing.

In the embodiment, the first and second resistors 352, 354 and the first and second switches 353, 355 determine the mode of operation of the card 351. For example, the card 351 may be operated in a normal mode for temperature measurements or a testing mode for resistance measurements. The circuitry shown is one example of the circuitry within both the resistance measurement circuit 306 and the temperature detection circuit 308.

In the example, when the card 351 is operated in a normal mode, the card 351 takes one or more temperature measurements from the thermocouple 202. In normal mode, the switches 353 and 355 are opened and voltage is run through the resistors 352 and 354. Voltage measurements are then read from the thermocouple, which is indicative of the temperature at the hot junction. The switches 353, 355 may be any known electronic switch, including for example, a multiplexer, transistor, or the like.

When the card 351 is operated in a testing mode, the card 351 takes one or more resistance measurements from the thermocouple 202. This is accomplished by closing the switches 353, 355 and measuring a voltage across the resistor positioned within the thermocouple 202. This measurement is compared to the known resistance value of the resistor positioned in the thermocouple to determine whether a short circuit exists in the thermocouple.

The measurements taken from the thermocouple in either the normal mode or the testing mode are transmitted to the A/D module 356. The A/D module 356 functions the same or similarly as A/D modules 312, 318 in FIG. 3.

The A/D module 356 is coupled to the microchip 358. The microchip may be any integrated circuit capable of processing voltage and/or resistance measurements taken from the thermocouple under various operating modes. The microchip 358 accepts the digital output of the A/D module 356 and internally processes the measurements. The processing enables the card 351 to determine the temperature measurements during the normal mode and the resistance measurements during testing mode. In addition, the microchip 351 may access stored algorithms to analyze and process the one or more digital signals received from the A/D module 356. The microchip 358 may store the digital signals for later retrieval and analysis, immediately analyze the signals, and/or output information to an operator of the monitoring system 200 indicative of the health of the analog thermocouple 202.

In some embodiments, the microchip 358 outputs digital signals, notifications, depictions, or the like, indicative of a problem in the thermocouple, such as, for example, a high resistance, ground fault, open circuit, short circuit, deterioration of the circuit, or the like. The microchip 358 may indicate likely causes of the issues and/or recommend solutions to the problems. In yet further embodiments, the microchip 358 may provide an operator of the monitoring system 200 periodic updates on the health of the analog thermocouple regardless of whether the data indicates that there may be a problem with the health of the thermocouple. The updates may be transmitted to an operator via, for example, an operator computing device. The operator computing device may be connected to the digital processing system 206 via any known network (such as described below with reference to FIG. 6).

In some embodiments, the digital output of the microchip 358 is then transmitted to the data processing system 206 for further processing, storing, analyzing, or the like. In other embodiments, no further processing occurs after the processing in the microchip 358.

Figure 5:
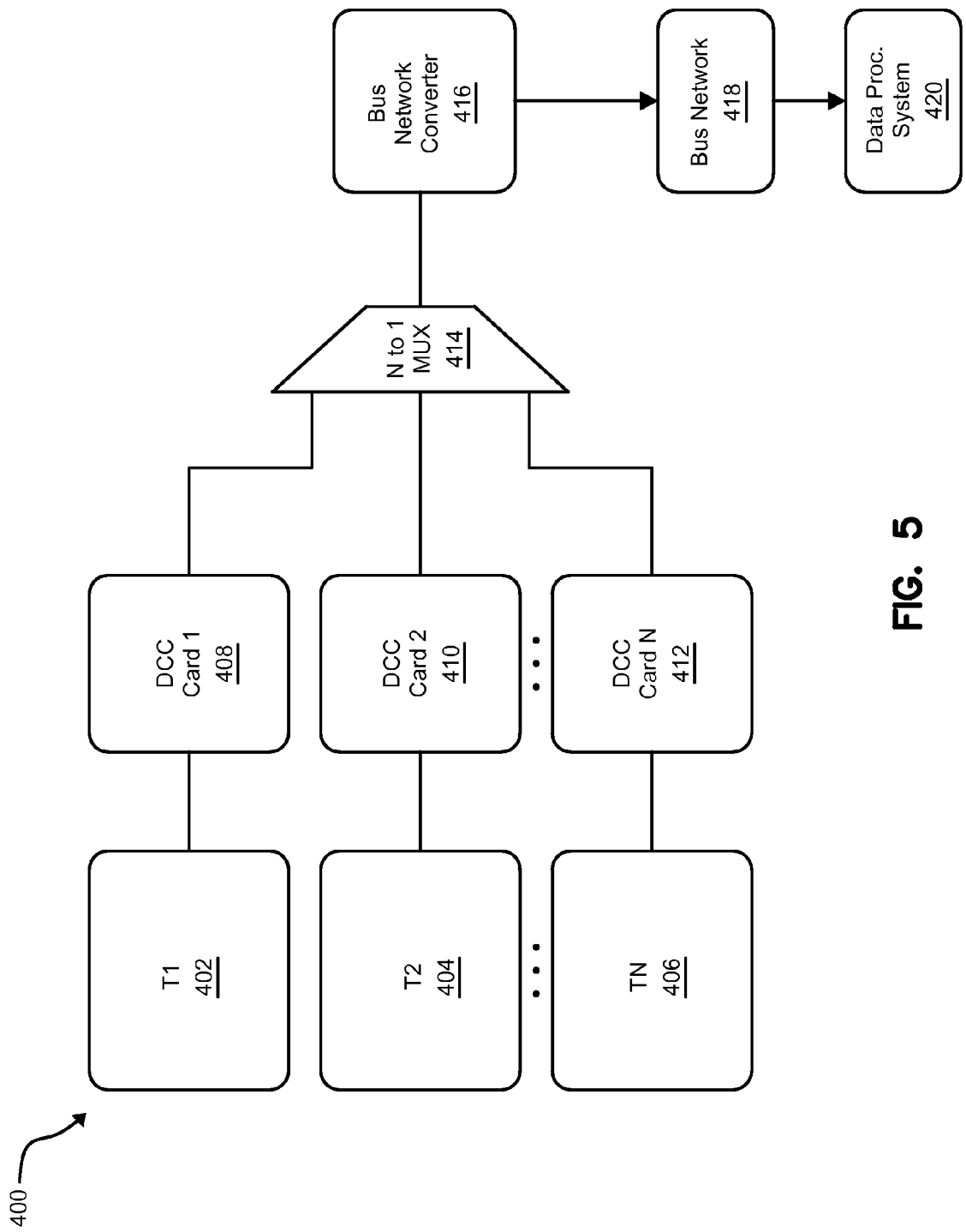
FIG. 5 is a schematic diagram of a circuit used in accordance with an illustrative embodiment.

Referring now to FIG. 5, an alternate embodiment of an example thermocouple monitoring system 400 is shown. The monitoring system 400 is one example of the monitoring system 200, as shown in FIG. 2. The monitoring system 400 includes thermocouples 402, 404, and 406, data collection and conversion cards 408, 410, and 412, a system MUX 414, a bus network converter 416, a bus network 418, and a data processing system 420. In general, the monitoring system 400 monitors a plurality of thermocouples, gathers and converts data from each of the plurality of thermocouples, compresses all of the collected data into a digital data stream, and processes the data via transmittal through the bus network 418.

The thermocouples 402, 404, and 406 are coupled to data collection and conversion cards 408, 410, and 412, respectively. It is understood that though only three thermocouples are depicted in the illustration, the number of thermocouples present in the system is dependent on the operator of the system and the type system being monitored.

In some embodiments, the thermocouples may be positioned within a grain elevator for temperature sensing at various locations. In particular, thermocouples may be positioned within and/or around a grain elevator to ensure that the temperature of various grain carrying components are within allowable temperature ranges such that the grain is not triggered to explode. For example, the thermocouple 402 may be arranged to measure the temperature of a bearing assembly within a conveyor system that is part of a grain elevator. Alternatively or additionally, thermocouple 404 may be arranged to measure the temperature of a belt guide within the same or a different conveyor system. Other thermocouples, such as, thermocouple 406 may be positioned elsewhere in the grain elevator to sense the temperature of other another grain carrying component.

The thermocouples 402, 404, and 406 are examples of the analog thermocouple 202. For example, the thermocouples 402, 404, and 406 may be T-type analog thermocouples having an embedded resistor roughly 0.5 inches from the junction of each thermocouple 402, 404, and 406. In yet further embodiments, the thermocouples 402, 404, and 406 may not all include a resistor, but include some electrical component as described above with reference to FIG. 1. It is not necessary that each thermocouple 402, 404, and 406 include the same type of electrical component.

The data collection and conversion cards 408, 410, and 412 receive signals indicative of measurements from the thermocouples 402, 404, and 406, respectively. The data collection and conversion cards 408, 410, and 412 are examples of the data collection and conversion card 300 shown in FIG. 3 or the card 351 shown in the FIG. 4 and have functionality that is the same or similar to these cards discussed above. Thus, the cards 408, 410, and 412 collect measurements from the thermocouples 402, 404, and 406, pass them through at least one of integrity resistance measurement circuit, temperature detection circuit, and/or ground fault detection circuit, and then convert the signals to digital signals via A/D modules (e.g., A/D modules 312, 318). The digital signals are then processed via internal microchips. The digital signals are them combined via an internal card MUX, as described above.

The cards 408, 410, and 412 are coupled to the system MUX 414. The system MUX 414 receives the digital signals from each of the cards 408, 410, and 412, and indexes and combines the digital output signals into a single system digital stream indicative of the health of each thermocouple in the system 400.

The MUX 414 is further coupled to the bus network converter 416, which is coupled to the bus network 418. The bus network converter 416 and the bus network 418 (described above with reference to FIG. 5) enable the transmittal of the single system digital stream output of the MUX 414 to the data processing system 420, where the digital stream may be decomposed, analyzed, processed, and/or stored.

In particular, the data processing system 420 acts similarly to the data processing system 206. The data processing system 420 receives the digital stream and extracts measurements and data related to the integrity of each individual thermocouple 402, 404, and 406 and analyzes the data. The data may be analyzed separately with respect to each thermocouple if the thermocouples 402, 404, and 406 are not connected or part of the same circuitry. Alternatively, the data may be analyzed separately or together with respect to each thermocouple if the thermocouples 402, 404, and 406 are part of an array of interconnected circuitry.

Figure 6:
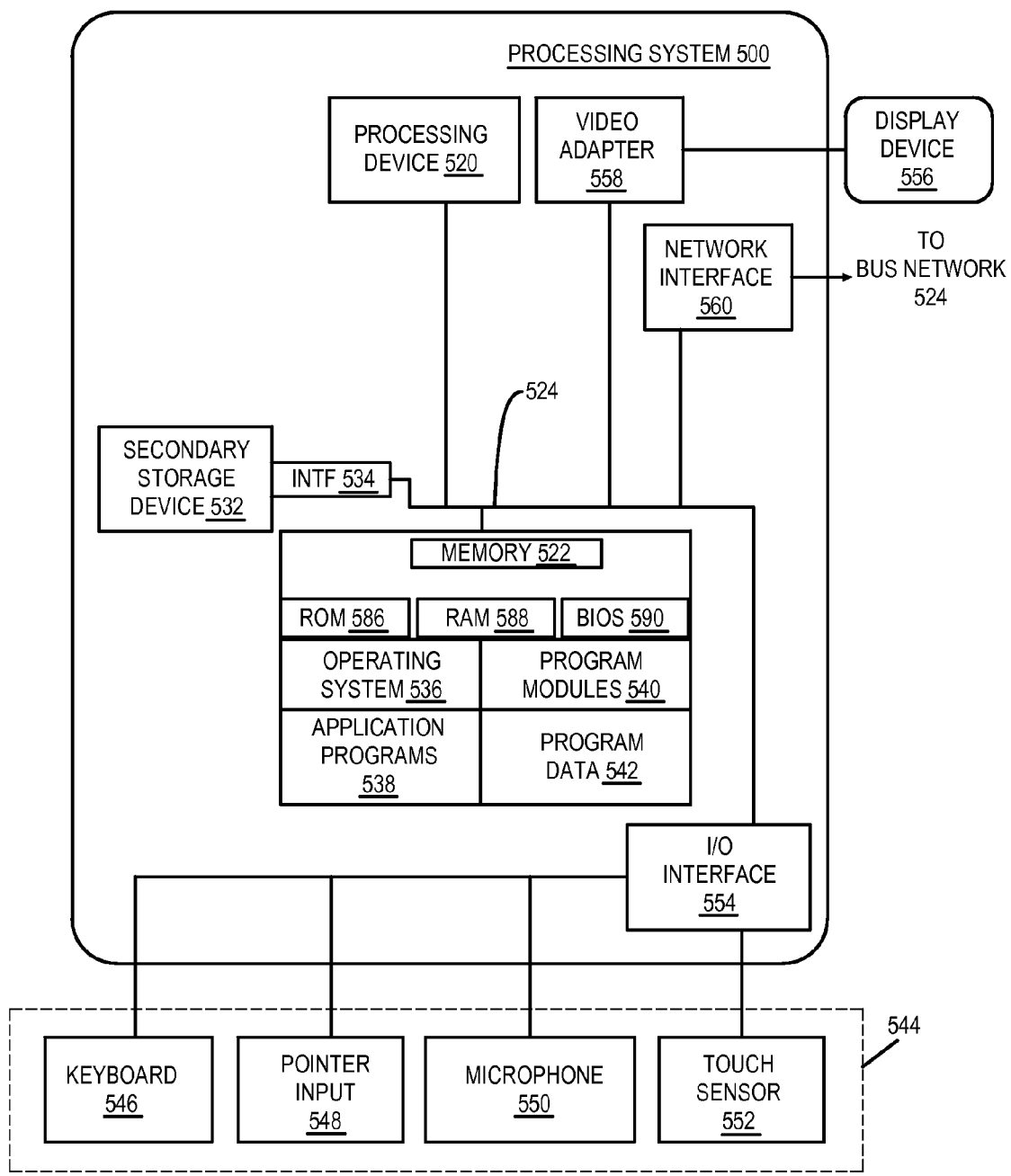
FIG. 6 is an exemplary architecture of a computing device that can be used to implement aspects of the present disclosure.

Now referring to FIG. 6, an exemplary architecture of a computing device that can be used to implement aspects of the present disclosure, including aspects of the digital processing system 206 and/or operator computing device (as described above with respect to FIG. 2). For simplicity, the exemplary architecture will be referred to herein as the processing device 500. One or more computing devices, such as the type illustrated in FIG. 6, are used to execute the operating system, application programs, and software modules (including the processing algorithms and other functions of the digital processing system 206) described herein.

The processing system 500 includes, in some embodiments, at least one processing device 520, such as a central processing unit (CPU). A variety of processing devices are available from a variety of manufacturers, for example, Intel or Advanced Micro Devices. In this example, the processing system 500 also includes a system memory 522, and a system bus 524 that couples various system components including the system memory 522 to the processing device 520. The system bus 524 is one of any number of types of bus structures including a memory bus, or memory controller; a peripheral bus; and a local bus using any of a variety of bus architectures. For example, the system bus 524 may be the bus network 418 as described above with reference to FIG. 5.

Examples of computing devices suitable for the processing system 500 include a desktop computer, a laptop computer, a tablet computer, a mobile phone device such as a smart phone, or other devices configured to process digital instructions.

The system memory 522 includes read only memory 526 and random access memory 528. A basic input/output system 530 containing the basic routines that act to transfer information within the processing system 500, such as during start up, is typically stored in the read only memory 526.

The processing system 500 also includes a secondary storage device 532 in some embodiments, such as a hard disk drive, for storing digital data. The secondary storage device 532 is connected to the system bus 524 by a secondary storage interface 534. The secondary storage devices and their associated computer readable media provide nonvolatile storage of computer readable instructions (including application programs and program modules), data structures, and other data for the processing system 500.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media.

A number of program modules can be stored in secondary storage device 532 or memory 522, including an operating system 536, one or more application programs 538, other program modules 540, and program data 542. The database 508 may be stored at any location in the memory 522, such as the program data 542, or at the secondary storage device 532.

In some embodiments, the processing system 500 includes input devices to enable administrators, operators of the system, other users, and/or computing devices to provide inputs to the processing system 500. Examples of input devices 544 include a keyboard 546, pointer input device 548, microphone 550, and touch sensitive display 552. Other embodiments include other input devices 544. The input devices are often connected to the processing device 520 through an input/output interface 554 that is coupled to the system bus 524. These input devices 544 can be connected by any number of input/output interfaces, such as a parallel port, serial port, game port, or a universal serial bus. Wireless communication between input devices and interface 554 is possible as well, and includes infrared, BLUETOOTH® wireless technology, 802.11a/b/g/n, cellular or other radio frequency communication systems in some possible embodiments.

In this example embodiment, a touch sensitive display device 556 is also connected to the system bus 524 via an interface, such as a video adapter 558. The touch sensitive display device 556 includes touch sensors for receiving input from a user when the user touches the display. Such sensors can be capacitive sensors, pressure sensors, or other touch sensors. The sensors not only detect contact with the display, but also the location of the contact and movement of the contact over time. For example, a user can move a finger or stylus across the screen to provide written inputs. The written inputs are evaluated and, in some embodiments, converted into text inputs.

In addition to the display device 556, the processing system 500 can include various other peripheral devices (not shown), such as speakers or a printer.

When used in a local area networking environment or a wide area networking environment (such as the Internet), the processing system 500 is typically connected to the network through a network interface, such as a wireless network interface 560. Other possible embodiments use other communication devices. For example, some embodiments of the processing system 500 include an Ethernet network interface, or a modem for communicating across the network.

The processing system 500 typically includes at least some form of computer-readable media. Computer readable media includes any available media that can be accessed by the processing system 500. By way of example, computer-readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the processing system 500.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

Figure 7:
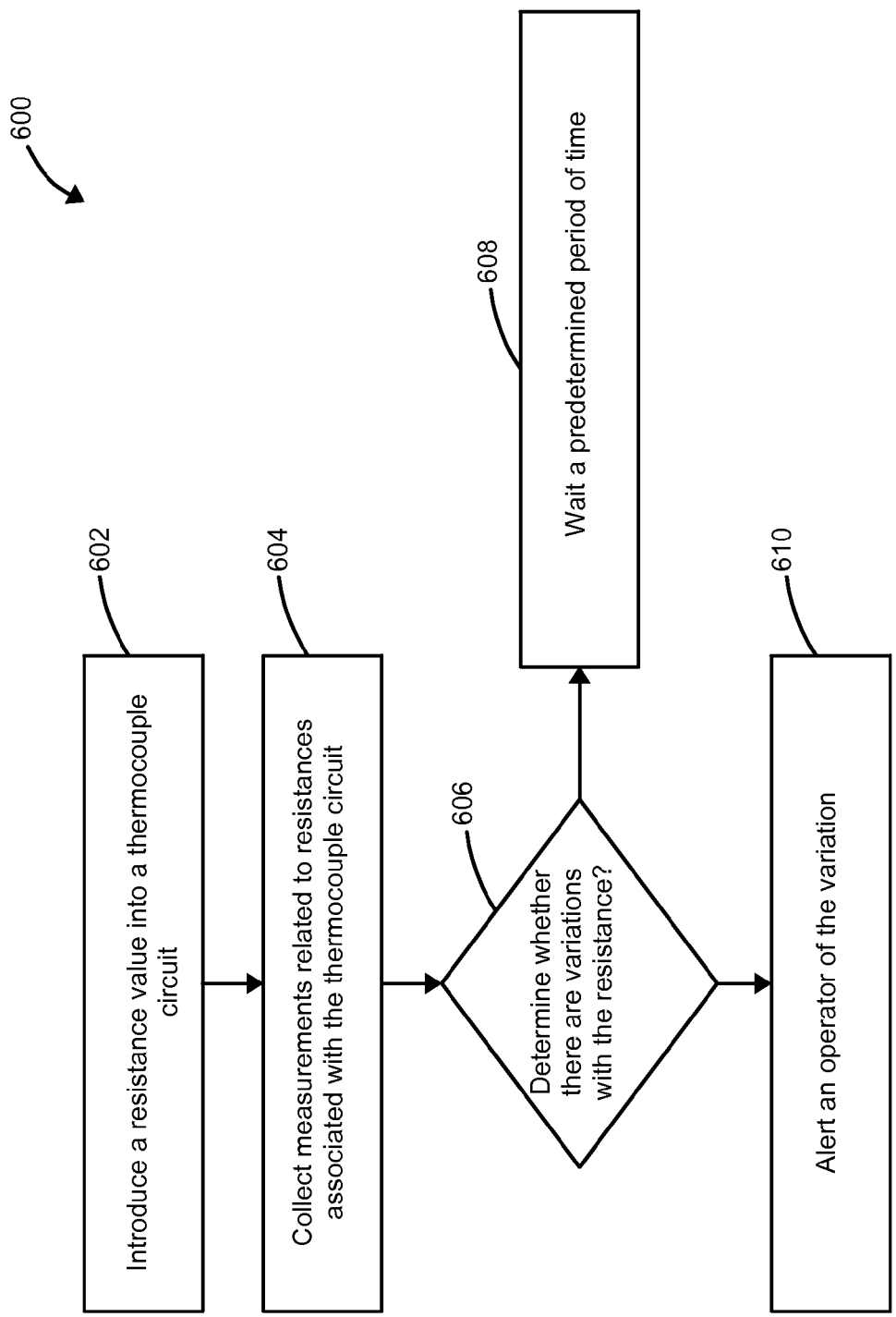
FIG. 7 is a flow diagram showing aspects of a method for monitoring circuit integrity, according to an illustrative embodiment.

Now referring to FIG. 7, a flow diagram showing aspects of an example method 600 for monitoring circuit integrity is shown. The method 600 includes operations 602, 604, 606, 608, and 610. In general, the method 600 illustrates one example of monitoring the health of a thermocouple by adding a known resistance value into a thermocouple circuit. It is understood that the operations of method 600 may be implemented by the circuits, components, devices, and/or computing devices described herein.

The method 600 begins at operation 502 when a resistance value is introduced into a thermocouple circuit. The addition of the resistance value may be accomplished during manufacturing of the thermocouple prior to use. In some embodiments, the resistance value is added via a resistor as described above with reference to FIG. 1. For example, in a T-type thermocouple, the resistor is added to the constantan wire within 0.5 inches from the hot junction of the thermocouple. As described above, other variations exist.

Upon installation of the resistor into the thermocouple, the method 600 proceeds to operation 604 where measurements relating to the added resistor are collected and analyzed. For example, the measurements may be collected by a circuit such as the resistance measurement circuit 306, which gathers voltage measurements across the wire having the embedded resistor and/or other voltage measurements across alternate wires as reference measurements. In some embodiments, the signals are analog signals which are then converted into digital signals via an A/D module, as described above. The digital signals are then compressed and transmitted to a digital processing system (e.g., digital processing system 206) for data analysis.

Upon collecting the measurements, the method 600 proceeds to operation 606 in which the system determines whether there are any variations with the resistance. In some examples, the digital processing system 206 and/or microchip 358 inputs the measured values collected in operation 604 into stored algorithms to determine resistance values. Thereafter, the calculated resistance values are compared with the known resistance value added to the thermocouple circuit. Variations in the values may indicate problems with the integrity of the thermocouple, for example, a circuit shortage, an open circuit, deformation and/or deterioration of the wires, and the like. The digital processing system 206 and/or microchip 358 may be programmed with stored acceptable variation ranges in which a significant variation in values is defined as any values outside of the acceptable variation ranges.

Based on the determination in operation 606, the method may proceed to either operation 608 or operation 610. In operation 608, the digital processing system 206 and/or microchip 358 determines that no significant variations exist and thus the system waits a predetermined period of time until again proceeding to operation 604 to again collect real-time measurements from the thermocouple.

If the digital processing system 206 and/or microchip 358 determines in operation 606 that a significant variation in the resistance exists, the digital processing system 206 and/or microchip 358 proceeds to operation 610 where an operator of the system is alerted of the variation indicating integrity issues with the thermocouple. The data processing system 206 and/or microchip 358 may transmit the variation data to an operator's computing device and indicate likely causes of the issues and/or recommend solutions to the problems. In other embodiments, however, the data processing system 206 and/or microchip 358 may provide an operator of the monitoring system 200 periodic updates on the health of the analog thermocouple regardless of whether the data indicates that there may be a problem with the health of the thermocouple. In yet further embodiments, if the data processing system 206 and/or microchip 358 determines that a serious issue exists, it may automatically shut down the thermocouple and/or any devices and/or components subject to the temperature measurements by the thermocouple.

Figure 8:
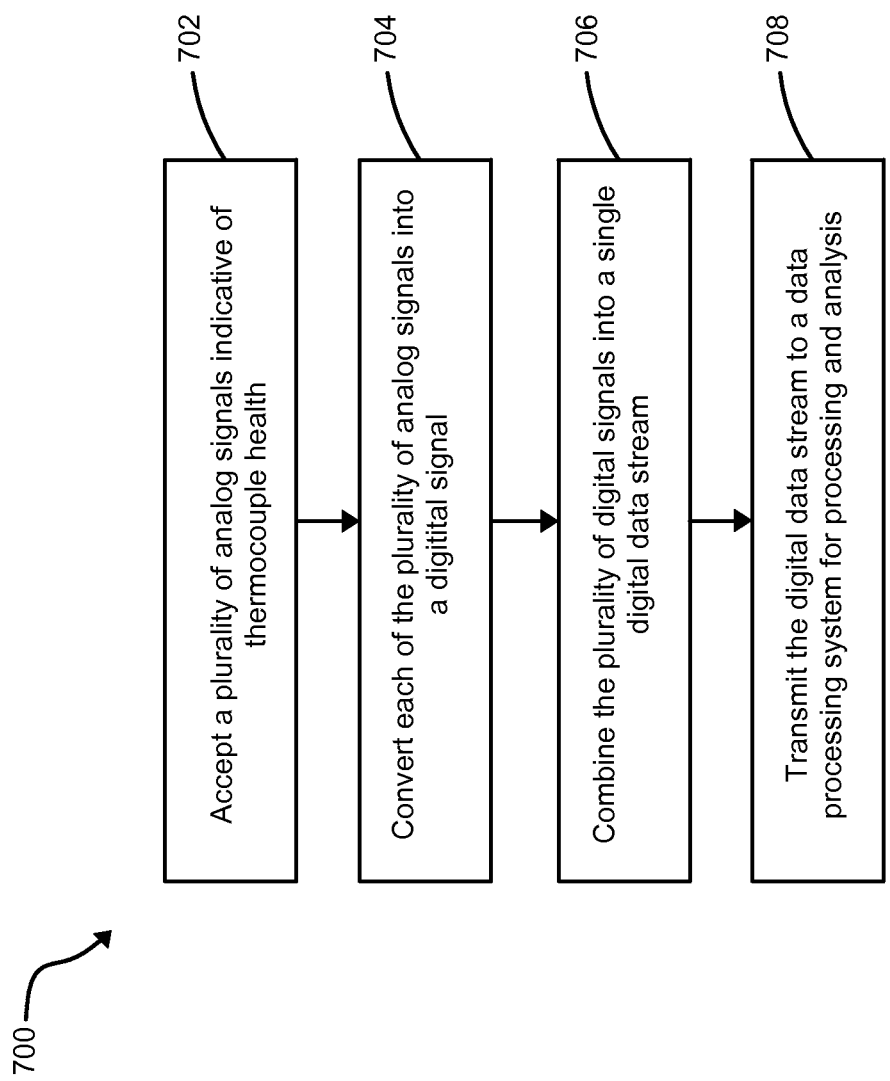
FIG. 8 is a flow diagram showing aspects of a method for monitoring circuit integrity, according to an illustrative embodiment.

Now referring to FIG. 8, a flow diagram showing aspects of an example method 700 for monitoring circuit integrity is shown. The method 700 includes operations 702, 704, 706, and 708. In particular, the method 700 includes example operations that exist as part of the operation 604 in the method 600.

The method 700 begins at operation 602 where a plurality of analog signals indicative of thermocouple health is received. Operation 602 may be implemented by components within a data collection and conversion card, such as that shown in FIG. 3. The measurements may be collected by any of the circuits 306, 308, at various periodicities that are set by the system based on the condition being monitored.

At operation 704, each of the plurality of analog signals is converted into a digital signal. This operation may be accomplished via the A/D modules described above with reference to FIG. 3. In some embodiments, the signal may first be filtered for noise reduction via, for example, a low-pass filter, prior to passing the signal to an A/D converter. In yet further embodiments, the signal may not be filtered, and instead, pass directly to the A/D converter.

At operation 706, the plurality of digital signals outputted from the several A/D modules 312, 318, are converted into a single digital data stream via an internal card MUX, such as the MUX 322. The MUX 322 then transmits the single digital data stream to a processing unit, such as, for example, the data processing system 206 and/or and internal processing unit such as the microchip 358 for processing and analysis in the operation 608. As stated above, the data processing system 206 and/or microchip 358 utilizes stored algorithms in conjunction with the received measured values to make determinations about the health of the thermocouple.

Figure 9:
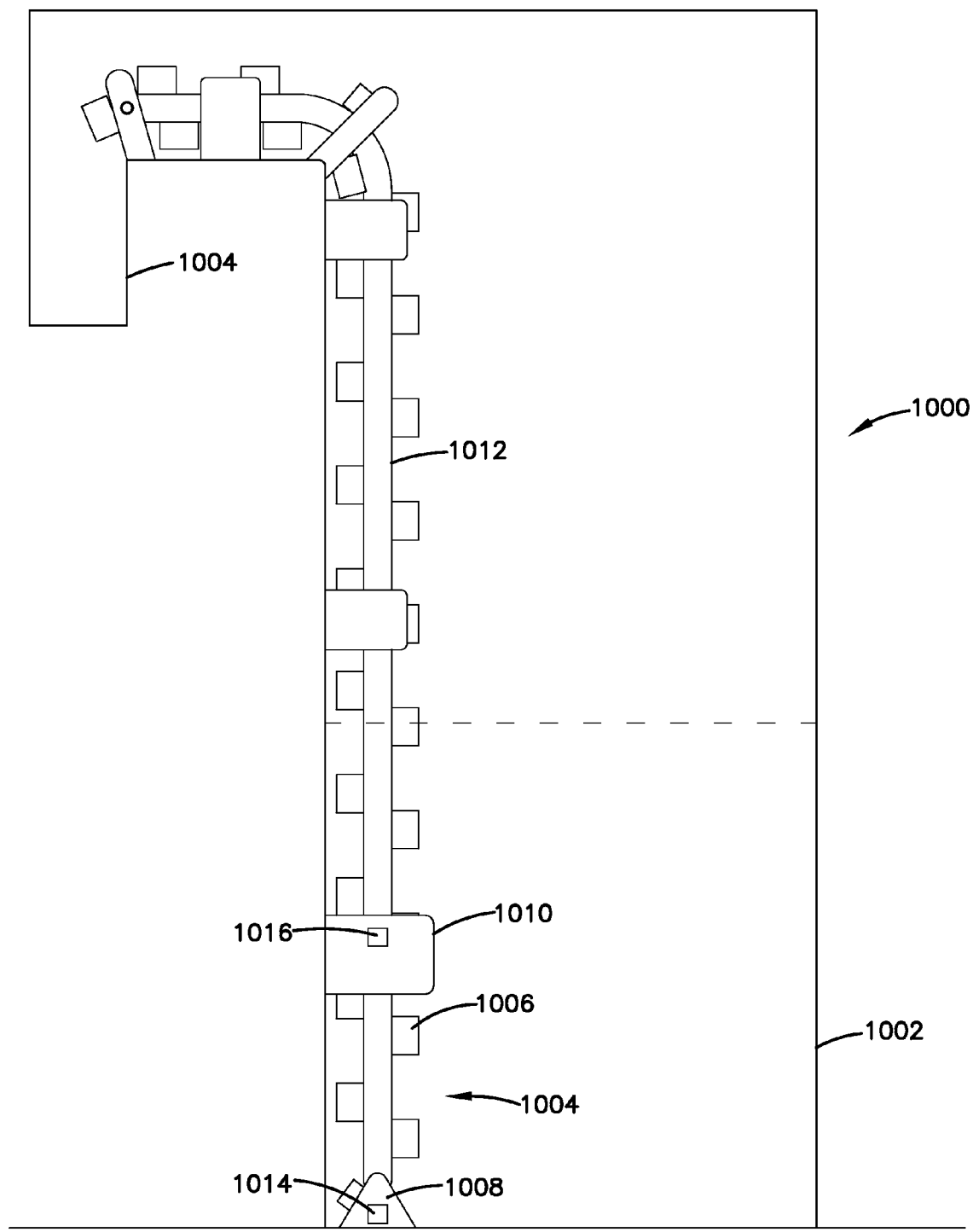
FIG. 9 is schematic diagram of the example monitoring system used in accordance with another an illustrative embodiment.

In one embodiment, the thermocouple system can be implemented as part of system for explosion avoidance. One example application of such a system is for grain processing. Referring to FIG. 9, this type of application could include a grain container 1000 including a storage portion 1002 and a discharge outlet 1004. A conveyor system 1004 is provided therein that is configured to circulate buckets 1006 that transport grain from the storage portion 1002 to the discharge outlet 1004.

In the depicted embodiment the conveyor system including a bearing assemblies 1008 and belt guide 1010. The bearing assemblies 1008 cooperate to facilitate smooth forward rotation of the belt 1012 that drives the buckets 1006. In the depicted embodiment a first thermocouple 1014 is configured and arranged to measure the temperature of the bearing assembly 1008. A second thermocouple 1016 configured and arranged to measure the temperature of the belt guide 1010. The first and second thermocouples 1014, 1016 include a first wire formed from a first conductor, a second wire formed from a second conductor, the second conductor including a dissimilar metal from the first conductor; and a hot junction formed at a contact point of the first wire and the second wire; and a resistor coupled to the second wire and positioned within 6.0 inches from the hot junction.

The explosion avoidance system of FIG. 9 includes a monitoring system that reads the temperature of the thermocouples 1014, 1016 to assess whether the bearing assembly 1008 or belt guide 1010 has generated enough heat to possibly cause an exposition. The belt guide 1010 could, for example, be excessively rubbing against the belt 1012 thereby increasing in temperature, or the bearings in the bearing assembly could have failed causing the bearing assembly 1008 to generate excessive heat. The monitoring system is also configured to collect measurements related to the resistor from the first and second thermocouples 1014, 1016 for failure detection of the first and second thermocouples; and alerting an operator of the conveyor system when the monitoring system detects a failure in at least one of the first and second thermocouples.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A system for monitoring temperatures with fault detection comprising:
   a plurality of thermocouples each including:
      a first wire formed from a first conductor;
      a second wire formed from a second conductor, the second conductor including a dissimilar metal from the first conductor; and
      a hot junction formed at a contact point of the first wire and the second wire; and
      a resistor coupled to the second wire and positioned adjacent to the hot junction;
   a plurality of data collection and conversion cards arranged and configured to:
      periodically collect a plurality of analog measurement signals from the plurality of thermocouples, the analog measurements being voltage measurements used to determine health of each of the plurality of thermocouples;
      convert the plurality of analog measurement signals to a plurality of digital measurement signals; and
      compress the plurality of digital measurement signals into a single digital stream of data;
      wherein the plurality of data collection and conversion cards each respectively coupled to each of the plurality of thermocouples; and
   a data processing system arranged and configured to receive the single digital stream of data, access stored algorithms, and utilize data within the single digital stream to determine whether integrity issues exist with any thermocouple in the plurality of thermocouples.

2. The system of claim 1, wherein the first conductor is copper and the second conductor is constantan.

3. The system of claim 1, wherein the resistor has a resistance of between 100 ohms to 5000 ohms.

4. The system of claim 1, wherein the resistor has a resistance of between 1500 ohms to 2500 ohms.

5. The system of claim 1, wherein the resistor is a wirewound resistor.

6. The system of claim 1, wherein the resistor is located within 0.5 inches from the hot junction.

7. The system of claim 1, wherein the plurality of data collection and conversion cards each comprise:

a plurality of A/D converters arranged and configured to each output at least one digital measurement signal in the plurality of digital measurement signals;

an internal multiplexor coupled to each of the plurality of A/D converters, wherein the internal multiplexer accepts the at least one digital measurement signal from each of the plurality of A/D converters and compresses the at least one digital measurement signal into the single digital stream of data.

8. The system of claim 1, wherein each of the plurality of thermocouples is a T-type thermocouple.

9. The system of claim 1, wherein the resistor has a resistance of between 1000 ohms to 5000 ohms.

10. The system of claim 1, wherein the resistor is located within 1.0 inches from the hot junction.

11. The system of claim 1, wherein at least one of the plurality of A/D converters is an 18-bit A/D converter.

12. The system of claim 1, further comprising an open detection circuit.

13. The system of claim 1, further comprising a fault detection circuit.

14. A method of manufacturing a thermocouple comprising:

selecting a predetermined resistance value, wherein the predetermined resistance value is at least twice as high as the resistance in the thermocouple, but substantially small enough to create a negligible effect on the functionality of the thermocouple; and installing a resistor with the predetermined resistance value into the thermocouple, wherein the resistor is coupled to a wire of the thermocouple and located within 1.0 inch from a hot junction of the thermocouple.

* * * * *